United States Patent [19]

Ebisawa et al.

[11] Patent Number: 5,657,309
[45] Date of Patent: Aug. 12, 1997

[54] VIDEO DISC RECORDING AND PLAYBACK SYSTEM WITH TWO RECORDING AREAS TO RECORD AN INFORMATION SIGNAL AND A REFERENCE SIGNAL

[75] Inventors: Kan Ebisawa; Kazumichi Hatate, both of Kanagawa, Japan

[73] Assignee: Sony Corporation, Tokyo, Japan

[21] Appl. No.: 530,667

[22] Filed: Sep. 20, 1995

[30] Foreign Application Priority Data

Sep. 21, 1994 [JP] Japan ................................ 6-251659

[51] Int. Cl.$^6$ ............................. H04N 5/84; G11B 20/12
[52] U.S. Cl. .................. 369/124; 369/48; 369/44.37; 369/107; 369/275.3; 360/27; 360/64; 386/40; 386/88; 386/37; 386/126
[58] Field of Search ................... 369/44.37, 44.38, 369/107, 275.1, 275.3; 358/342, 310, 336, 3, 337; 386/40, 37, 88, 45, 50, 90, 123, 126; 360/27, 64

[56] References Cited

U.S. PATENT DOCUMENTS

| | | | |
|---|---|---|---|
| 5,012,351 | 4/1991 | Isono et al. | 386/126 |
| 5,166,806 | 11/1992 | Ebisawa et al. | 386/90 |
| 5,233,437 | 8/1993 | Tachibana et al. | 386/50 |
| 5,442,455 | 8/1995 | Hioki et al. | 386/37 |
| 5,448,539 | 9/1995 | Kamioka | 369/32 |
| 5,485,441 | 1/1996 | Maeda | 369/44.37 |

FOREIGN PATENT DOCUMENTS

| | | | |
|---|---|---|---|
| 0 515 014 A1 | 11/1992 | European Pat. Off. | G11B 7/14 |
| 0 598 611 A2 | 5/1994 | European Pat. Off. | G11B 7/14 |
| 2 188 474 | 9/1987 | United Kingdom | G11B 23/18 |

OTHER PUBLICATIONS

IEEE Transactions on Consumer Electronics, vol. 35, No. 3/Aug. 1989 Optical Disc System for Wideband High Definition Video Signal by Kaoru Tachibana et al.

Patent Abstracts of Japan, vol. 013, No. 364 (E–805), 14 Aug. 1989 & JPA–A–01 120974 (Sanyo Electric Co. Ltd) 12 May 1989.

Patent Abstracts of Japan, vol. 014, No. 128 (P–1019), 9 Mar. 1990 & JP–A–01 320645 (Matsushita Electric Ind Co Ltd), 26 Dec. 1989.

Patent Abstracts of Japan, vol. 013, No. 383 (E–811), 24 Aug. 1989 & JP–A–01 132283 (Sanyo Electric Co Ltd) 24 May 1989.

*Primary Examiner*—Georgia Y. Epps
*Assistant Examiner*—Kim-Kwok Chu
*Attorney, Agent, or Firm*—Limbach & Limbach L.L.P.

[57] ABSTRACT

A disc recording device for recording a first information signal and a second information signal, e.g. a pilot signal, on a disc-shaped recording medium comprises an optical pick-up having first and second laser diodes for recording the first and second information signals on the disc-shaped recording medium, a first modulator for modulating the first information signal at a first frequency, a first laser diode modulator for driving the first laser diode based on a signal outputted from the first modulator, a generator for generating the second information signal of a second frequency and a second laser diode modulator for driving the second laser diode based on the second information signal.

20 Claims, 9 Drawing Sheets

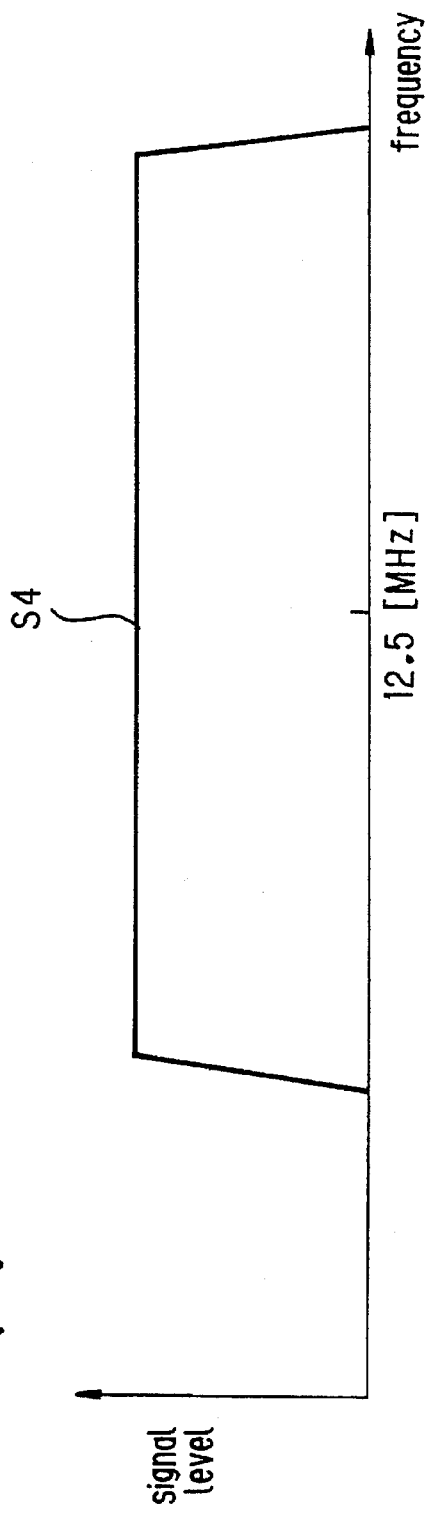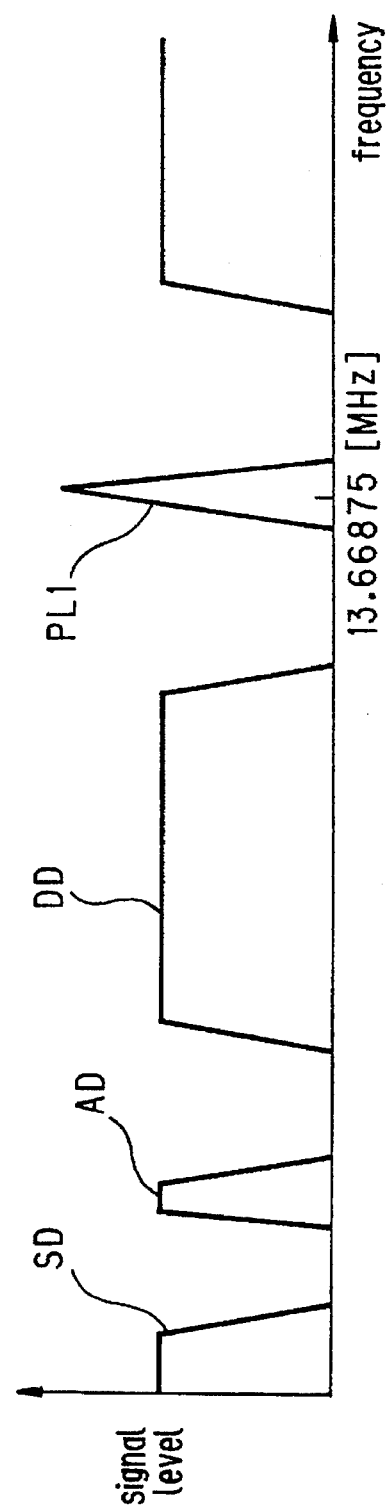

pick-up arrangement example

VIDEO DISC RECORDING AND PLAYBACK SYSTEM WITH TWO RECORDING AREAS TO RECORD AN INFORMATION SIGNAL AND A REFERENCE SIGNAL

BACKGROUND OF THE INVENTION

1. Field of the Invention

The present invention relates to an optical disc device for converting, for example, a high quality television signal to an image signal for a MUSE (Multiple Sub-Nyquist Sampling Encoding) system and recording and playing back the image signal.

2. Description of Related Art

In conventional optical disc devices for recording and playing back image signals for MUSE systems, the time base of the playback signal can be corrected based on this pilot signal by frequency multiplexing and then recording the pilot signal and deterioration of image quality can be effectively prevented. FIG. 7 shows the whole of the optical disc device, with high quality television signals being recorded onto a so-called "write once" optical disc 2.

To form this optical disc 2, a polycarbonate board is spin coated with an organic pigment film. Then, a reflecting film is formed by vapor deposition, with this then being coated in a protective plastic layer. Further, a so-called "pregroove" which acts as a guide channel for a laser beam is formed so as to wind through the information recording surface. Tracking control may then be achieved by using this pregroove and position information for the position of illumination of the laser beam may be detected.

Namely, with regards to the optical disc device 1, the laser beam emitted from the internal laser diode of the optical pick-up 3 is focused onto the information recording surface of the optical disc 2 by an internal objective lens. The light returned from the optical disc 2 is then focused by the objective lens and received by an internal photoelectric detector. The receiving surface of the photoelectric detector is divided, for example, across the direction of the radius and the circumference of the optical disc 2, with output signals being outputted for each of the divided light-receiving surfaces.

Moreover, with regards to the optical disc 1, after current/voltage conversion in a current/voltage converter not shown in the drawings, the output signals of each of the receiving surfaces are amplified by a preamplifier 4 (PRE AMP). The servo circuit 5 performs arithmetic processes on the output signal of the preamplifier 4 and, as a result of this, generates a tracking error signal and a focus error signal. The servo circuit 5 adjusts and object lens of the optical pick-up 3 based on the tracking error and focus error signals so as to form an overall servo loop in the optical disc device 1, and tracking control and focus control may therefore be exerted.

With regards to a position detector circuit 6, after the output signal of a current/voltage converter circuit is amplified at a prescribed gain, arithmetic processes are carried out. In this way, a wobble signal, the signal level of which varies in response to the windings of the pregroove, is generated. A spindle servo circuit 7 starts operating under the control of a system controller circuit 8 and rotatably drives the spindle motor 9 so that the carrier frequency of the wobble signal becomes a prescribed frequency. In this way, a servo loop is formed and the optical disc 2 is rotated under constant linear velocity conditions.

Further, the position detector circuit 6 detects position information for the laser beam illumination position by demodulating this wobble signal using a built-in FM (Frequency Modulation) demodulation circuit and the detection results are outputted to the system controller circuit 8. In this way, at the optical disc device 1, overall operation is controlled at the system controller circuit 8 based on this position information so that a high quality television signal may be recorded at or played back from a prescribed region.

This is to say that the optical disc device 1 rotatably drives the optical disc 2 under constant linear velocity conditions. Further, the high quality television signal S1 outputted from the video cassette recorder (VCR) 10 is inputted to a MUSE encoder (ENC) 11 together with an audio signal. The MUSE encoder 11 then converts the high quality television signal S1 and the audio signal into a MUSE system image signal S2 and outputs the result. Moreover, the MUSE encoder 11 generates a demodulation reference signal S3 for the image signal S2 and this reference signal S3 is outputted to a pilot generator (GEN) 12.

The pilot generator (GEN) 12 generates a sine wave pilot signal PL with a frequency of 2.278125 MHz based on the reference signal S3 and this pilot signal PL is recorded on the optical disc 2 as a time-base corrected reference signal. The address encoder (ENC) 13 then generates an address signal consisting of a time code signal for the image signal S2 provided from the VCR 10, which is then outputted to a mixer 14 at a prescribed time. In this way, the mixer 14 time-base multiplexes this address signal at the 564 lines of the image signal S2 without restrictions with regards to the user area.

The frequency modulation circuit (FM MOD) 16 modulates the image signal S2 outputted from the mixer 14 at a central frequency of 12.5 MHz. The mixer 17 adds the pilot signal PL to the output signal S4 of the frequency modulation circuit 16 and outputs the result. The mixer 17 also frequency multiplexes an audio signal SD of a prescribed format. As shown in FIG. 8, with regards to the optical disc device 1, the frequency modulated signal S4 of the image signal S2, the pilot signal PL and the digital audio signal SD are frequency multiplexed and then recorded on the optical disc 2.

Namely, a laser diode modulation circuit (LD MOD) 18 drives the internal laser diode of the optical pick-up 3 and increases the amount of laser beam light from the amount used during playback to the amount required during recording on the rising edge of the output signal from the mixer 17. In this way, at the optical disc device 1, the amount of laser beam light intermittently rises in response to the output signal for the mixer 17, a sequence of pits are formed on the optical disc 2 and a high quality television signal S1 is recorded.

With respect to this, and referring to FIG. 9, during playback, the optical disc device 1 successively projects a laser beam from the optical pick-up 3 using the amount of light at the time of playback and an output signal for the optical pick-up which can be obtained from these results is outputted to the preamplifier 4. In this way, at the optical disc device 1, the output signal for the preamplifier 4 is processed using the servo circuit 5 in the same way as at the time of recording so as to control the tracking and the focus. Further, at the time of playback, the preamplifier 4 generates a playback signal for which the signal level varies in response to the amount of returned light by adding the output signals for each of the light receiving surfaces. This playback signal is then band limited and outputted.

This band limiting separates each of the signals PL, S4 and SD in accordance with the frequency allocation illustrated in FIG. 8. At the optical disc device 1, the playback signal for the pilot signal of these signals is outputted to the PLL (Phase Locked Loop) circuit 20. The PLL circuit 20 then generates a reference signal taking the playback signal for this pilot signal PL as a reference and a dividing signal S6 for this reference signal is then outputted to the spindle servo circuit 7.

In place of a wobble signal, at the time of playback, the spindle servo circuit 7 drives the spindle motor 9 so that the frequency of this divided frequency S6 becomes a predetermined frequency. As a result of this, with the write-once-type optical disc replaced, the optical disc can be rotatably driven under constant linear velocity conditions at the optical disc device 1 even when playing back from a playback-dedicated optical disc made by, for example, sputtering. At this time, the spindle servo circuit 7 drives the spindle motor 9 taking the internal clock CK generated by a clock generating circuit 21 as a reference.

Further, the PLL circuit 20 generates a 27.3375 MHz clock signal CK1 from the reference signal and the playback signal is then time-base corrected at the optical disc 1 based on this clock signal CK1. The address decoder (DEC) 23 extracts and plays back the time-base multiplexed address signal by capturing and demodulating using an internal demodulating circuit the playback signal RF outputted from the preamplifier 4 at a prescribed timing. The playback results are then outputted to the system controller circuit 8. In this way, the optical disc 2 may be played back at the optical disc 1 based on this address information.

A frequency demodulation circuit (FM DEMOD) 24 modulates the playback signal RF and plays back a MUSE system image signal S7, with this played back image signal S7 being outputted to a time base correction circuit 25. The time base correction circuit 25 stores this image signal S7 taking the clock signal CK1 outputted from the PLL circuit 20 as a reference and outputs the stored image signal S7 taking the internal clock CK2 outputted from the clock generating circuit 21 as a reference so that the image signal S7 can be time base corrected.

The muse decoder (MUSE DEC) 26 converts the image signal S7 from the TBC 25 to a high-quality television signal S8 and then outputs this signal, which is the opposite to the time of recording. The image signal recorded on the optical disc 2 may then be monitored at the optical disc device 1 via a monitor, etc.

This kind of optical disc device 1 illuminates the optical disc 2 with a laser beam, alters the temperature of the information recording surface in a localized manner and forms a sequence of pits. The optical disc device 1 is therefore characterized by changes in the size of the pits formed on the optical disc 2 in response to the surrounding temperature, the optical disc sensitivity and the amount of laser beam light, etc. The asymmetry of the playback signal RF may be changed greatly by the conditions at the time of recording. Because of this, the optical disc device 1 is characterized by the duty of the RF playback signal being changed greatly by the conditions at the time of recording.

When the duty of the RF playback signal is changed in this way, the RF playback signal incurs non-linear distortion with respect to the laser diode driving signal (i.e. the signal inputted to the laser diode modulation circuit 18 of FIG. 8) at the time of recording and finally, intermodulation distortion is generated. As a result of this, the picture quality for the played-back image signal S7 deteriorates due to intermodulation distortion. Therefore, with this kind of optical disc device 1, the amount of laser beam light has to be controlled severely in response to the surrounding temperature, which complicates the overall construction.

In order to resolve these problems, one method was considered where a pilot signal PL (see FIG. 8) for pre-time base correction was recorded. i.e. a pilot signal PL was pre-recorded on the disc by preformatting the optical disc 2. Then, when recording, the image signal S7 was recorded using the pilot signal PL as a reference. However, in the case of this method, the image signal S7 had to be time base-corrected and then recorded at the time of recording taking the playback results for the pilot signal PL as a reference in order to be in synchronization with this pilot signal PL. This made the overall structure complicated.

As the present invention sets out to resolve the above problems, it is an object of the present invention to provide an optical disc device for converting a high-quality television signal to a MUSE system image signal and recording and playing back the MUSE system image signal, capable of preventing the playback signal from incurring interference from intermodulation distortion in a simple manner.

SUMMARY OF THE INVENTION

In order to achieve the aforementioned objects of the present invention, a disc recording device for recording a first information signal and a second information signal on a disc-shaped recording medium comprises an optical pick-up having first and second laser diodes for recording the first and second information signals on the disc-shaped recording medium, a first modulator for modulating the first information signal at a first frequency, a first laser diode modulator for driving the first laser diode based on a signal outputted from the first modulator, a generator for generating the second information signal of a second frequency and a second laser diode modulator for driving the second laser diode based on the second information signal.

The second information signal may be a sine wave signal and may also be a signal used in time-axis compensation of the first information signal while the first information signal is being played back from the disc-shaped recording medium. The first information signal may also be an image signal.

Further, the disc recording device may further comprise a frequency multiplexor for multiplexing and providing to the second laser diode modulator the second information signal and the audio signal, with the second laser diode modulator driving the second laser diode based on the multiplexed second information signal and audio signal.

Moreover, the multiplexor may be provided with an address signal of the first information signal and the address signal is frequency multiplexed with the second information signal and the audio signal and the second laser diode modulator may drive the second laser diode based on the multiplexed second information signal, audio signal and address signal.

Further, according to the present invention, a disc playback device for playing back a first information signal recorded on a disc-shaped recording medium and modulated at a first frequency and a second information signal having a second frequency comprises an optical pick-up having first and second laser diodes for playing back the first and second information signals from the disc-shaped recording medium, a demodulator for demodulating the played-back first information signal and a time-base compensator for carrying out time-base compensation based on the demodulated first information signal and the played-back second information signal.

The first information signal may be an image signal.

Moreover, according to the present invention, a disc-shaped recording medium comprises a first recording area recorded with a first information signal and a second recording area recorded with a reference signal for carrying out time axis compensation when the first information signal is being played back.

The first information signal may be an image signal and an audio signal may be recorded at the second recording area. Address information for the first information signal may also be further recorded at the second recording area.

The first and second recording areas may be present on the recording medium as a pair of adjacently formed, spiral pit rows.

BRIEF DESCRIPTION OF THE DRAWINGS

FIGS. 4A and 4B are characteristic curves showing the frequency allocation of the optical disc of FIG. 1;

DETAILED DESCRIPTION OF THE PREFERRED EMBODIMENT

First Embodiment

The following is a description based on the drawings of an embodiment of the present invention.

Figure 1:
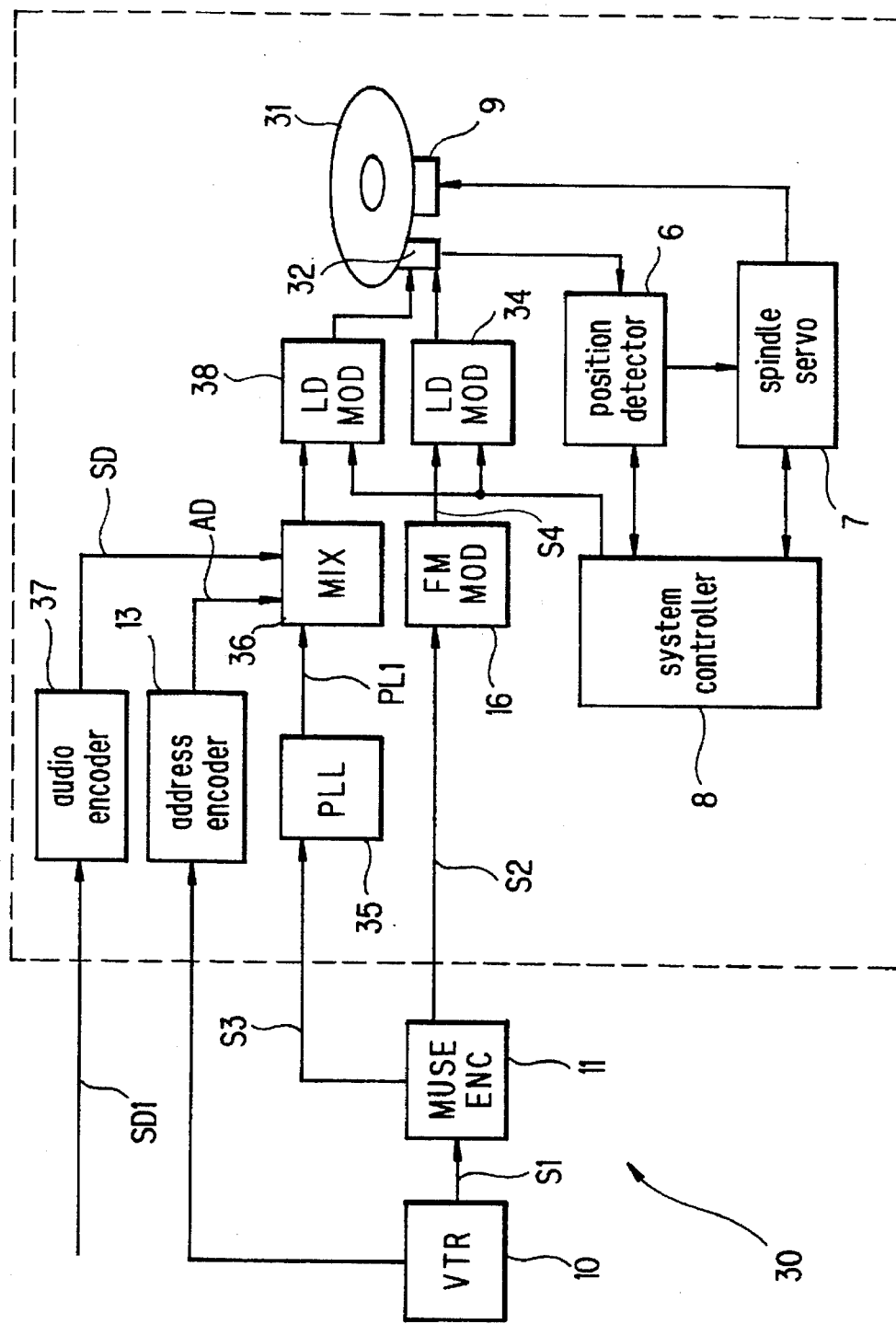
FIG. 1 is a block view showing an optical disc device according to the embodiment of the present invention.
Figure 5:
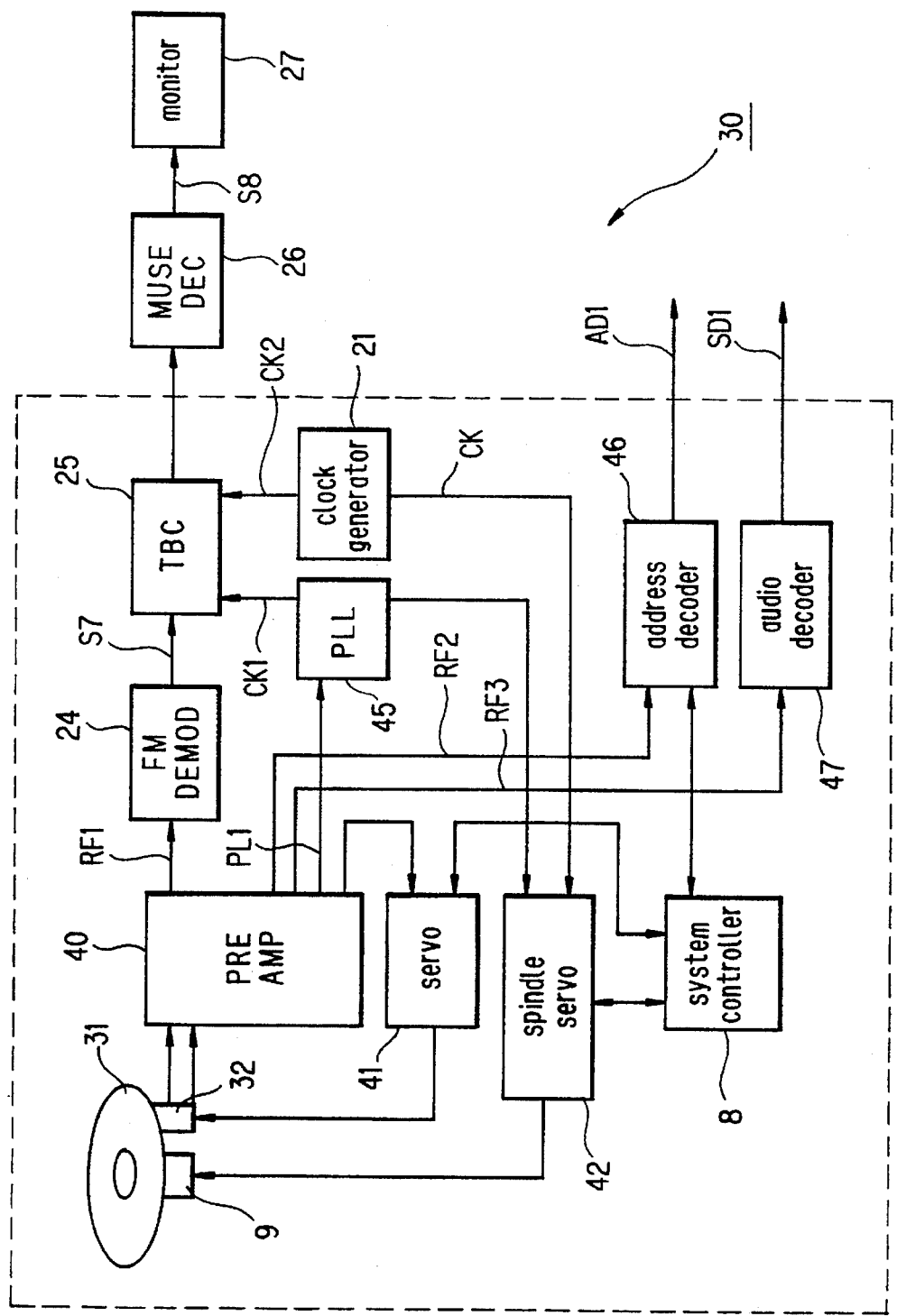
FIG. 5 is a block view showing the playback system for the optical disc device of FIG. 1.
Figure 7:
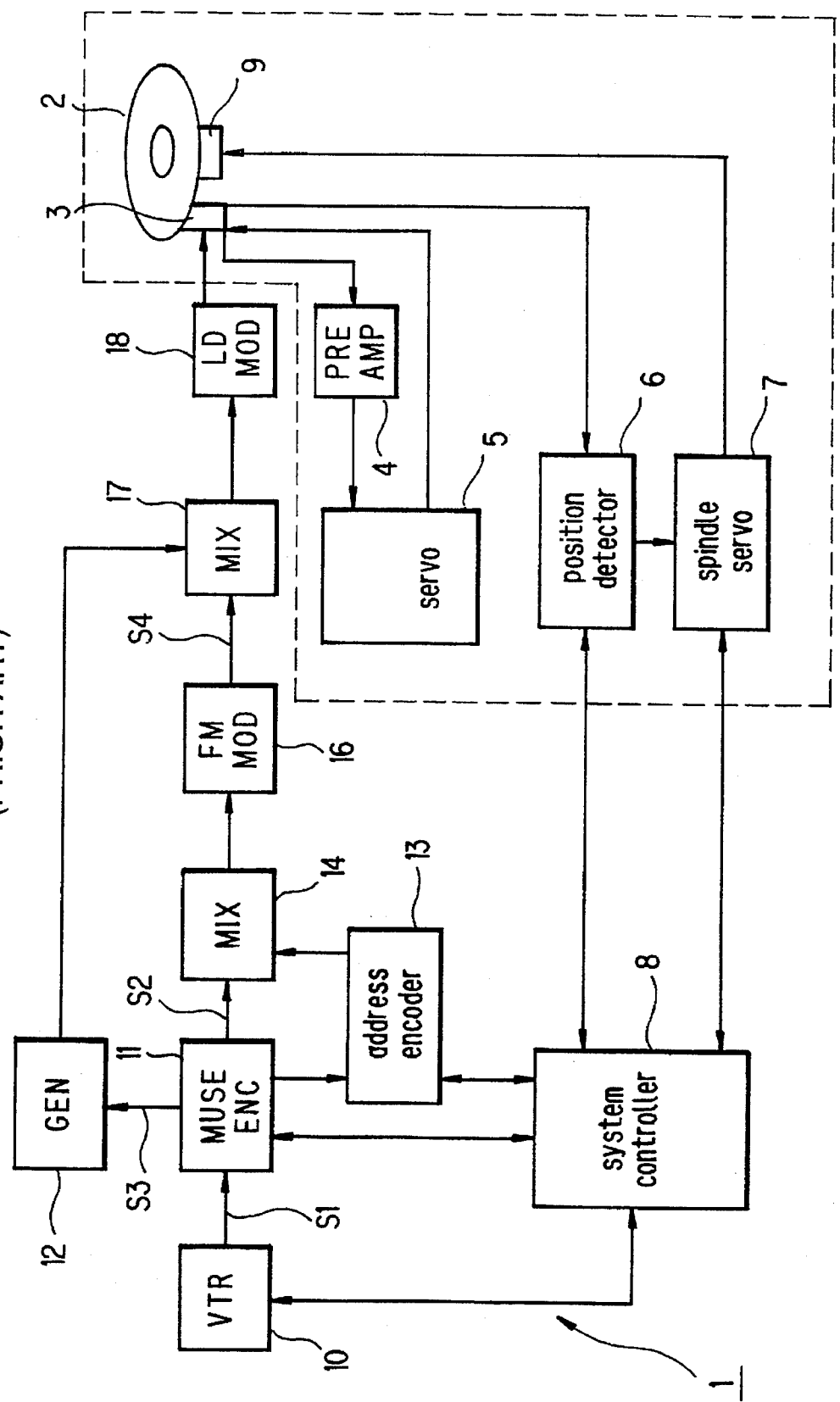
FIG. 7 is a block diagram showing a conventional optical disc device.
Figure 8:
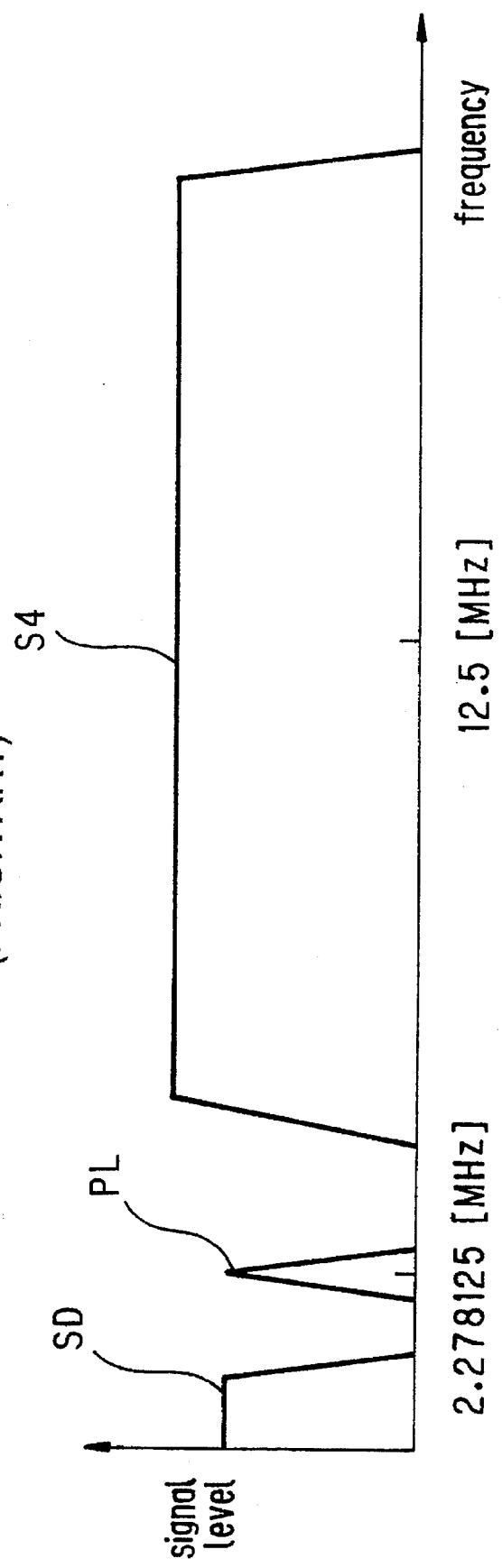
FIG. 8 is a characteristic curve showing the frequency allocation of the optical disc of FIG. 7.
Figure 9:
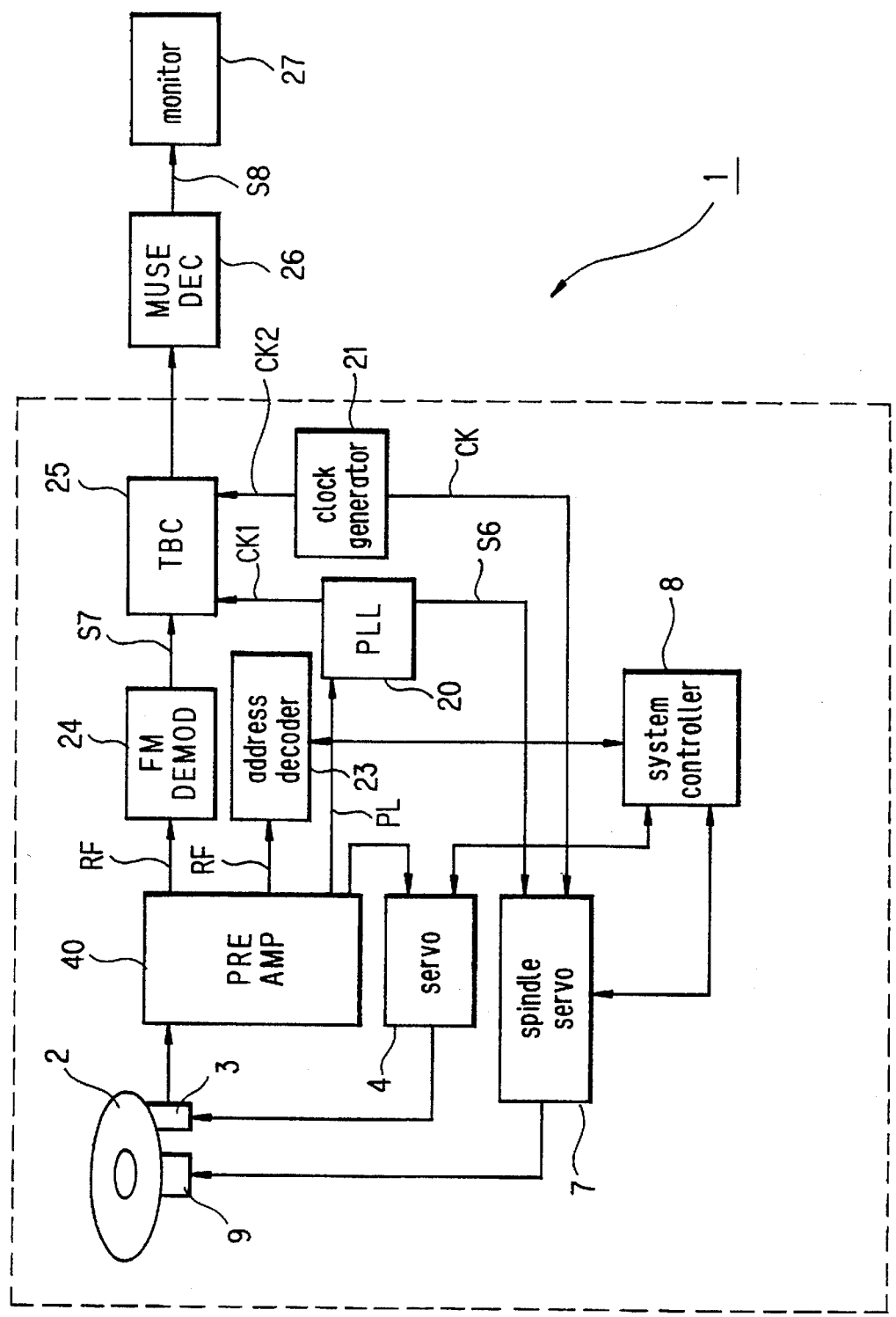
FIG. 9 is a block view showing the playback system for the conventional optical disc device of FIG. 7.

In FIG. 1, numeral 30 indicates an optical disc device taken as the entire body and in this embodiment an image signal and a pilot signal are recorded separately on an optical disc 31. Portions in FIG. 1 corresponding to portions in FIG. 5 and FIG. 7 are given the same numerals and overlapping of descriptions is avoided.

Figure 2:
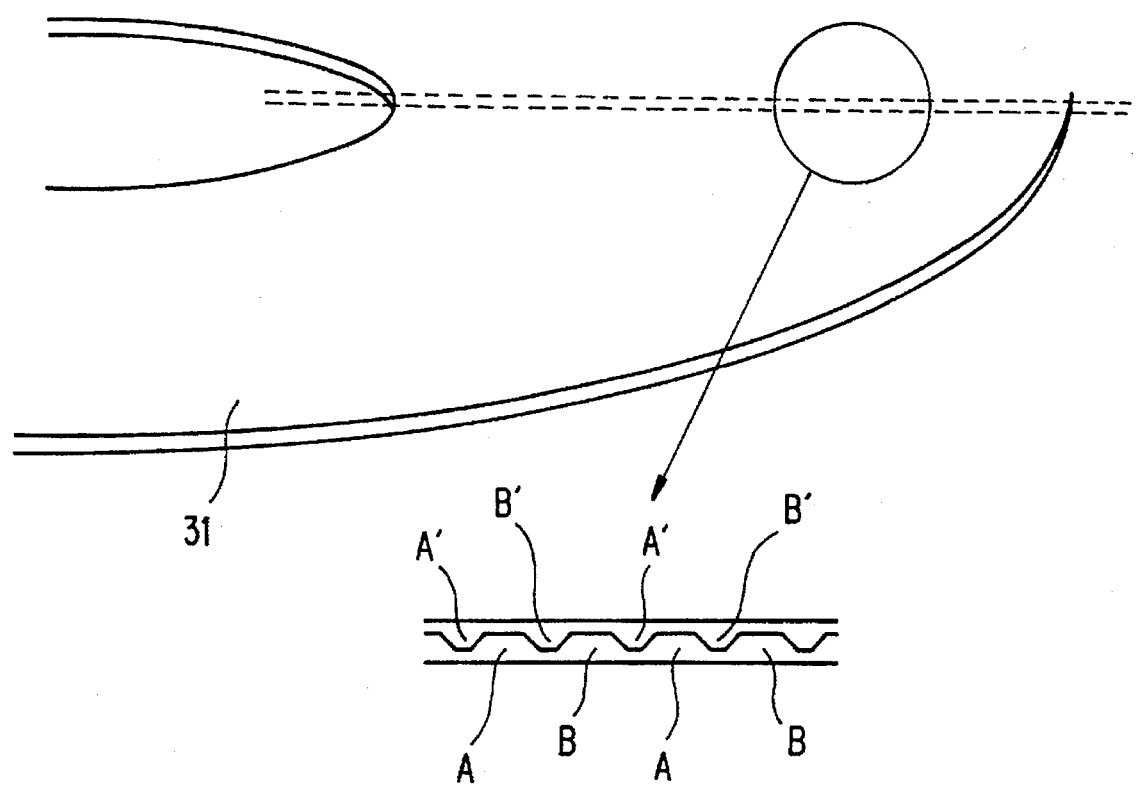
FIG. 2 is a conceptual view describing the illumination of recorded image signals and pilot signals.

Here, optical disc 31 is a write-once type optical disc in the same way as optical disc 2 but differs in that two spiral pre-grooves A' and B' shown in FIG. 2 are formed in a direction going from the inner periphery to the outer periphery. In this way, the two spiral pre-grooves A' and B' at the optical disc 31 are illuminated by two laser beams for reference purposes and two channel signals are recorded separately. Further, these pregrooves A' and B' are formed on the optical disc 31 so as to be winding. This makes rotational driving under constant linear velocity conditions possible by taking these winding pregrooves A' and B' as a reference and the position of illumination of the laser beam may be detected.

In order to be compatible with the optical disc 31, the optical pick-up 32 applied to this embodiment is two laser diodes supported as a single body capable of seeking in a direction along the radius of the optical disc 2. The optical pick-up 32 can accurately control the tracking and focusing of the laser beams shone from each of the laser diodes with respect to the two pregrooves formed in the optical disc. The optical pick-up 32 comprises an optical system, a light-receiving system and an automatic light amount controlling circuit formed so that pit shapes formed by each of the laser beams are of the stipulated shape.

Figure 3:
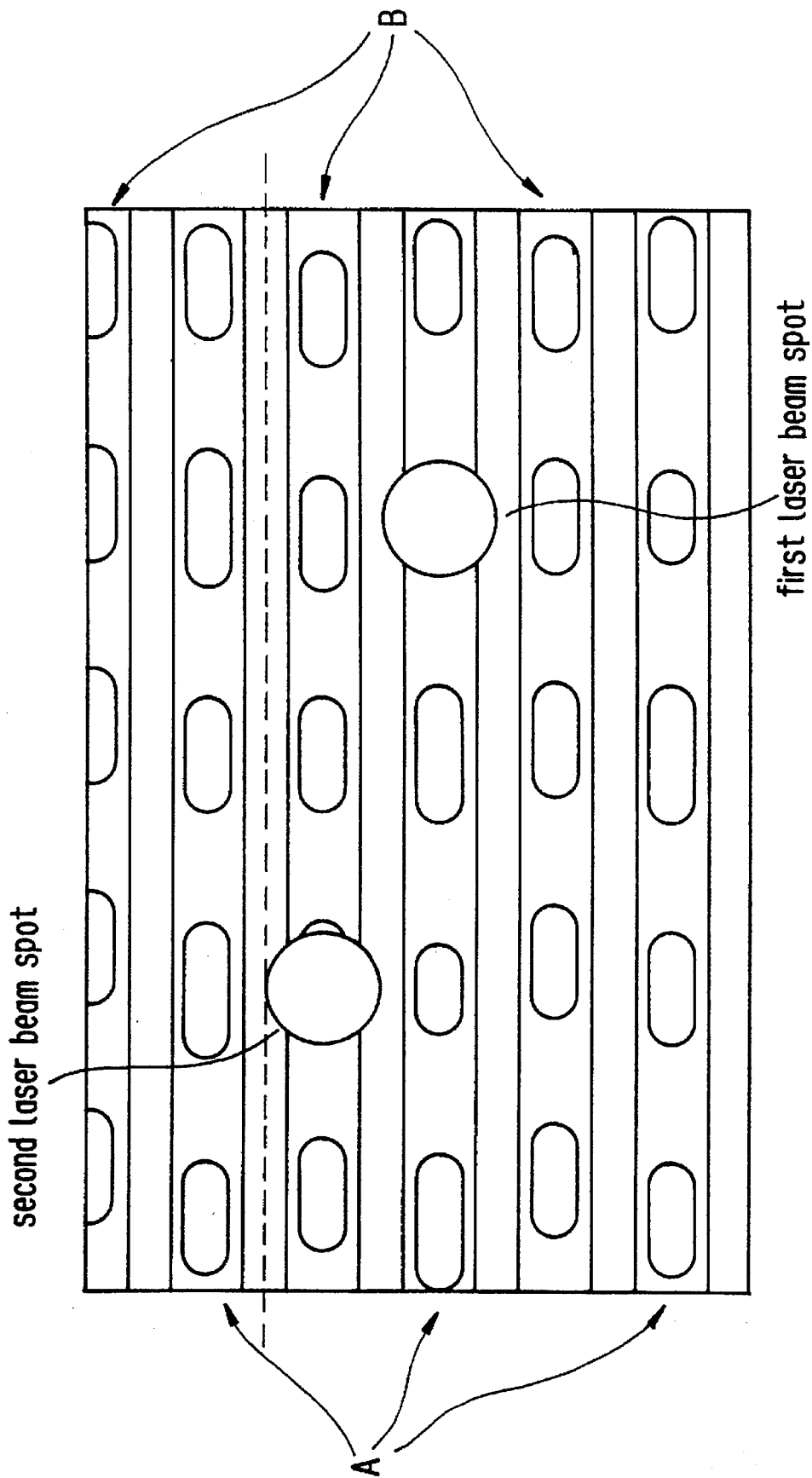
FIG. 3 is a schematic view from above showing the positions of the surface of the disc illuminated by first and second laser beam spots.

A pick-up having two laser diodes has been described in IEEE Transactions on Consumer Electronics, vol. 35, No. 3, August 1989. Further, FIG. 3 shows an enlarged view of the disc surface. The laser beam spot of the first laser beam strikes the first land A and the laser beam spot of the second laser beam strikes the second land B.

The corresponding servo circuit has two systems, a tracking error control system and a focus control system, although this is not shown in the drawings, with the tracking control and focus control being carried out based on results for the returned received light obtained using these two laser beams. In this way, the optical disc device 30 uses this two channel recording system to separate and then record signals as image signals and other signals and image signal picture quality deterioration is effectively prevented.

A position detector circuit 6 detects the illumination position of each laser beam taking the winding pregrooves A' and B' as a reference. Further, the spindle servo circuit 7 rotatably drives the optical disc 31 under constant linear velocity conditions taking the winding of a predetermined one of the two pregrooves A' and B' as a reference.

This is to say that the optical disc device 1 rotatably drives the optical disc 31 at a constant linear velocity. Further, the high quality television signal S1 outputted from the video cassette recorder (VCR) 10 is inputted together with the audio signal into the MUSE encoder (ENC) 11 while tracking control and focus control is exerted. The MUSE encoder 11 then converts the high quality television signal S1 and the audio signal into a MUSE system image signal S2 and outputs the result.

At the optical disc device 30, the frequency modulation circuit 16 frequency modulates the image signal S2 provided from the MUSE encoder 11 at an intermediate frequency of 12.5 MHz and outputs the result. Also, a first laser diode modulation circuit 34 takes a frequency modulated signal S4 of the carrier frequency (12.5 MHz) outputted from the frequency modulation circuit 16 as input and drives the first laser diode of the optical pick-up 32. The first laser diode modulation circuit 34 then drives the internal laser diode of the optical pickup 32 and increases the amount of laser beam light from the amount used during playback to the amount required during recording on the rising edge of this frequency modulated signal S4. In this way, at the optical disc device 30, a sequential pit row is formed on the first land A so as to follow the first pregroove A' of the optical disc 31 so as to correspond with this first laser beam. The image signal S2 formed from pit rows at the first channel is then recorded independently as shown in FIG. 4A.

A PLL circuit 35 takes a reference signal S3 for demodulation of the image signal S2 outputted from the MUSE encoder 11 as an input and generates a 13.66875 (MHz) sine wave signal. This sine wave signal is then outputted to a mixer 36 as a pilot signal PL1. The audio encoder 37 takes the digital audio signal SD1 and control data for the optical disc 31 as input and then frequency multiplexes this digital audio signal SD1 with the control data, outputting the result.

The mixer 36 frequency multiplexes and then outputs the address signal AD outputted from the address encoder 13, the frequency multiplexed signal SD outputted from the audio encoder 37 and the pilot signal PL1 outputted from the PLL circuit 35. A second laser diode modulating circuit 38 drives the second laser diode of the optical pick-up based on an output signal from the mixer 36. In this way, the second laser diode modulation circuit 38 drives the internal laser diode of the optical pickup 32 and increases the amount of laser beam light from the amount used during playback to the mount required during recording on the rising edge of the output signal of the mixer 36. As a result of this, at the optical disc device 30, a sequential pit row is formed on the second land B along the second pregroove B' of the optical disc 31 corresponding to this second laser beam and a second channel pilot signal PL1 formed at this pit row, digital audio signal SD1, address signal AD and control data DD are recorded (FIG. 4(B)).

The image signal S2 and signals other than the image signal S2 are therefore recorded separately at the optical disc device 30. Therefore, with regards to the image signal S2, the mixing-in of signal components other than the image signal S2 due to intermodulation can be effectively prevented at the time of playback and deterioration in the picture quality of the played-back image can be prevented accordingly. At the time of recording, control of the amount of light is simplified when compared with the related art and picture quality deterioration'is effectively prevented.

Further, in this embodiment, deterioration in the picture quality of the played back image can be effectively prevented even when the pilot signal PL1 is formed using a sine wave signal of a frequency of 13.66875 MHz which is near the carrier frequency of the image signal S2. i.e. with this type of optical disc, jitter of the playback signal varies due to pits formed through localized thermal breakdown on the plane of the information recording surface and the length of time for which the amount of laser beam light rises on the written light amount i.e. the ratio of variation in pit length due to the temperature changes for long pits and for short pits.

It follows that, as with conventional optical disc devices, if the frequency of the pilot signal PL becomes large with respect to the frequency of the image signal recorded at the optical track 31, accurate time base correction of the played back image signal cannot be achieved. In particular, if the image signal is a MUSE method image signal, if correct time base correction cannot be carried out in this way, the quality of the picture for the played back high-quality television signal is seriously deteriorated.

Moreover, if a pair of these kinds of neighboring pregrooves A' and B' are formed and the respective image signals and signals other than the image signals are recorded in two recording areas taking each of the pregrooves as a reference, if the pregrooves are formed close to each other, crosstalk is generated between the channels. With regards to this, if the frequency of the pilot signal is selected to be a frequency which is low with respect to the frequency of the image signal recorded at the optical disc 31, the pilot signal is recorded as a larger signal even if recorded with the same amount of light. In this case, the pilot signal mixes with the played back image signal due to crosstalk between channels.

In this way, the image signal S2 and the pilot signal PL1 may be recorded separately at the optical disc device 30, the pilot signal PL1 may be recorded using a sine wave signal of 13.66875 MHz which is near the carrier frequency of the image signal S2 and deterioration in the picture quality of the played back image is avoided.

Further, the pilot signal PL1 is recorded together with signals other than the pilot signal PL1 such as the address signal AD at this time, so that image signal picture quality deterioration is effectively avoided. i.e. if the pilot signal PL1 and the address signal AD etc. are frequency multiplexed and then recorded, intermodulation distortion occurs between this pilot signal PL1 and the address signal AD etc. However, the influence of this intermodulation is effectively prevented and accurate playback can be achieved because this pilot signal PL1 is a sine wave signal and the address signal AD etc. are digital signals.

Intermodulation of the pilot signal and other similar-type signals is made to have little influence on the image signal because deterioration in the S/N ratio as a result of intermodulation has an extreme effect on deterioration in the picture quality of the played back image. As a result of this, in this embodiment, image signals which are easily influenced are recorded separately and the overall quality of the optical disc device 30 is improved.

Moreover, the time base multiplexing process can be omitted by frequency multiplexing and then recording the address signal together with the pilot signal PL1 and the structure of the recording/playback system can be simplified accordingly.

FIG. 5 is a view showing the playback system for the optical disc device 30. The first and second laser beams are projected successively using the amount of light from the optical pick-up 32 at the time of playback and the output signal of the optical pick-up 32 obtained from these results is outputted to the preamplifier 40. In this way, at the optical disc device 30, the output signal of the preamplifier 40 is processed at the servo circuit 41 and each laser beam is tracking controlled and focus controlled in the same way as at the time of recording. Further, during playback, the preamplifier 40 generates a playback signal having a signal level varying in response to the amount of light returned for each of the laser beams. A first playback signal RF1 corresponding to the first laser beam of the pair of laser beams is outputted to a first frequency demodulation circuit 24.

The preamplifier 40 divides up the second playback signal corresponding to the second laser beam into bands in accordance with the frequency allocation described previously in FIG. 4b. Each of the divided playback signals RF2 and RF3 are then outputted together with the pilot signal PL1 to the address decoder 46, audio decoder 47 and PLL circuit 45, respectively. The PLL circuit 45 then generates a reference signal taking the playback signal of the pilot signal PL1 as a reference signal and this reference signal is outputted to the spindle servo circuit 42.

In place of the wobble signal, the spindle servo circuit 42 drives a spindle motor 9 at the time of playback so that the frequency of this reference signal becomes a standard frequency. In this way, at the optical disc device 30, the spindle motor 9 rotatably drives the optical disc 31 at a constant linear velocity. At the optical disc device 30, a servo loop is formed, the optical disc 31 is rotatably driven under constant linear velocity conditions and the frequency of the pilot signal PL1 which becomes the reference for the spindle servo is set up to be a high frequency when compared with the conventional art optical disc device 1. The optical disc 31 can therefore be rotatably driven with a high degree of precision when compared with the prior art optical disc device 1.

Further, the PLL circuit 45 generates a 27.3375 MHz clock signal CK1 from the reference signal. A time base correction circuit 25 stores the image signal S7 outputted from the frequency demodulation circuit 24 taking the clock signal CK1 as a reference, outputs the image signal S7 housed as a reference taking the internal clock CK2 outputted from a clock generation circuit 21 as a reference and in this way, carries out time base correction on the image signal S7.

With respect to this, an address decoder 46 demodulates the playback signal RF2 outputted from the preamplifier 40 using a built-in demodulation circuit, demodulates the address signal AD1 and sends an output to external equipment as necessary. Also, the audio decoder 47 decodes the playback signal RF3 outputted from the preamplifier 40 using a built-in frequency demodulation circuit and plays back and outputs control data for the image signal S7 and the digital audio signal SD1.

In the above construction, with regards to the recording mode, the optical disc device projects first and second laser beams from the optical pick-up 32 onto the optical disc 31 and controls the tracking and focus of each of the laser beams as well as rotatably driving the optical disc 31 under constant linear velocity conditions based on returned laser beam light.

Under these conditions, the image signal S1 outputted from the video tape recorder 10 is converted to a muse system image signal S2 by the MUSE encoder 11 and this image signal S2 is then frequency modulated to a frequency modulated signal S4 of carrier frequency 12.5 MHz by the frequency modulation circuit 16. This frequency modulated signal S4 is then outputted to the first laser diode modulation circuit 34 where the first laser diode of the optical pick-up is driven by this frequency modulated signal. A sequential pit row is then formed at the optical disc 31 taking the first pregroove as a reference in accordance with the first laser beam shone from this laser diode.

With regards to this, an image signal S2 and a demodulation reference signal S3 are generated at the MUSE encoder 11. A pilot signal PL1 comprising a sine wave signal of frequency 13.66875 MHz is generated at the PLL circuit 35 taking this reference signal S3 as a reference. After being frequency multiplexed at the mixer 36 with the digital audio signal SD1, the control data and the address signal, this pilot signal PL1 is outputted to the second laser diode modulator circuit 38, and the second laser diode of the optical pick-up 32 is driven by this frequency multiplexed signal.

In this way, at the optical disc 31, a sequential pit row is formed taking the second pregroove as a reference in accordance with the second laser beam shone from the laser diode and a pilot signal PL1, digital audio signal SD1, control data and address signal are recorded at a recording track formed at this pit row.

During playback, the focusing and tracking of each of the respective laser beams is controlled for the optical disc 31 based on the returned light for the first and second laser beams detected at the optical pick-up 32. Under these conditions, the playback signal of the pilot signal PL1 detected from the light in the second returned laser beam rotatably drives the spindle motor 9 so as to be at a regulation frequency so as to achieve rotatable driving at a constant linear velocity.

The playback signal RF1 detected from the light returned from the first laser beam of the laser beams is frequency demodulated so as to be converted to an image signal at the frequency demodulation circuit 24. This image signal is then time base-corrected at the time base correction circuit 25 and outputted to the MUSE decoder 26. In this way, at the optical disc device 30, a high quality television signal is obtained via this MUSE decoder 26.

The playback signal detected from the light returned for the second laser beam is divided into bands and outputted during outputting from the preamplifier 40, with the playback signal of the pilot signal PL1 being outputted to the PLL circuit 45. In this way, a clock signal CK1 for time base correction is generated at the PLL circuit 45 taking this pilot signal PL1 as a reference, outputted to the time base correction circuit 25 and a reference signal for operating the spindle servo circuit 42 is outputted.

The playback signal RF2 for the address signal and the playback signal RF3 for the digital audio signal are outputted to the address decoder 46 and the audio decoder 47, demodulated, and outputted to external equipment.

According to the aforementioned construction, by recording the image signal and the pilot signal separately on the optical disc 31, image signal deterioration due to intermodulation can be effectively prevented and deterioration in the picture quality of the image signal can be avoided accordingly. Further, by selecting the frequency of the pilot signal at this time to be in the frequency band of the image signal, image signal deterioration due to crosstalk can be effectively prevented and time base correction can be accurately carried out.

Moreover, not only the pilot signal, but digital audio signals etc. are also recorded with the pilot signal separately from the image signal. This effectively prevents the digital audio data from being influenced by effects due to intermodulation and avoids deterioration in the picture quality of the image signal. Also, time base multiplex processing is avoided for the address signal and this portion may therefore be omitted from the overall structure.

In the aforementioned embodiment, the case was described for the recording and playing back of a MUSE system image signal. However, the present invention is by no means limited to a MUSE system and may be applied widely to cases where a base band image signal is frequency modulated and recorded, or cases where a first information signal which easily picks up intermodulation interference and a second information signal played back and utilized at the same time as the first information signal are recorded/played back. It follows that in this case, the second information signal may not just comprise a pilot signal consisting of a reference signal for time base correction, but may otherwise comprise an audio signal which is frequency modulated and then distributed or digital data or and address signal etc. which may then be distributed independently.

Figure 6:
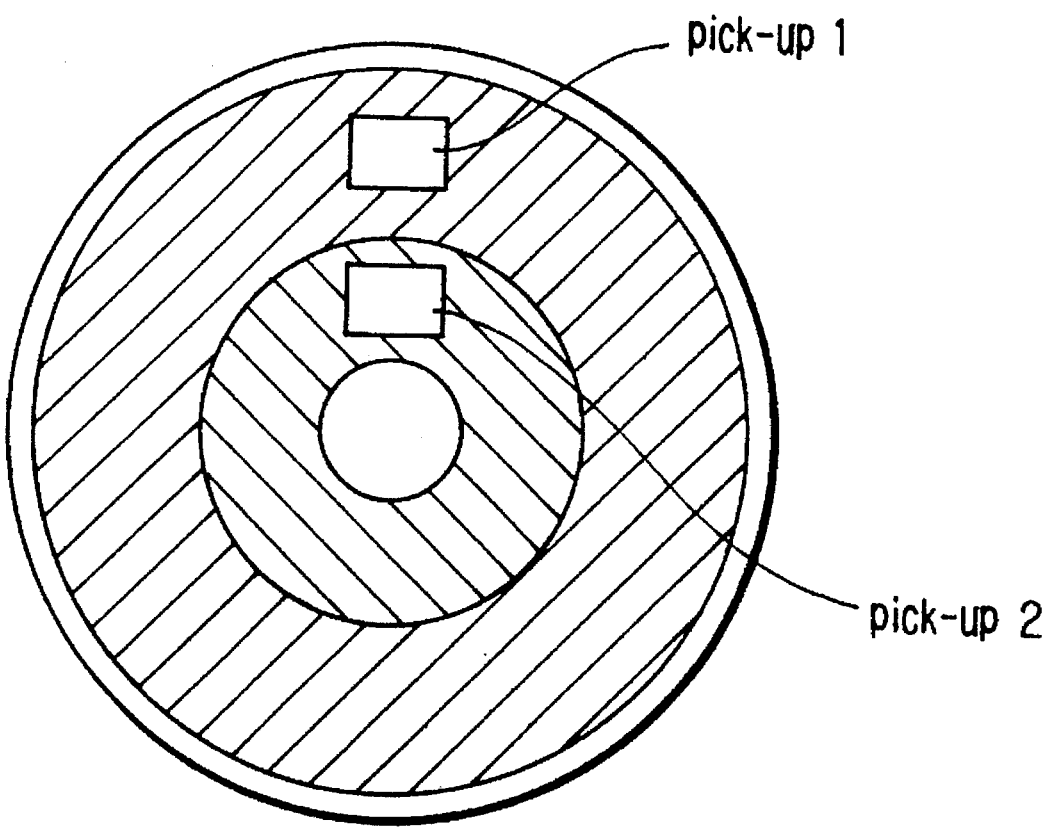
FIG. 6 is a view of the disc from above showing the relative positions of the pick-ups 1 and 2.

In the above embodiment, the case was described where one pair of grooves is formed in a spiral shape and two pit rows A and B are formed on the optical disc. However, the present invention is by no means limited in this regard so that, as shown for example in FIG. 6, an information recording surface is divided into two regions C and D, an inner periphery side and an outer periphery side, with the first and second information signals then being recorded respectively. In this case, first and second laser diodes are provided separately for the first and second pick-ups, respectively.

Further, in the above embodiment, the case has been described for an optical disc being driven at a constant linear velocity but the present invention is by no means limited in this respect, and may also be applied to the case of driving under a constant angular velocity or the case of changing over the rotational speed of the optical disc gradually from the inner periphery to the outer periphery of the optical disc, known as zoning.

Further, in the above embodiment, the case was described for the application of the present invention to a write once-type optical disc and optical disc device, but the present invention is by no means limited in this regard, and may also be widely applied to playback-dedicated optical discs and playback devices, magneto-optical discs and recording/playback devices, or playback dedicated devices.

According to the present invention described above, a first information signal comprising a MUSE system image signal etc. is recorded or merely played back by an optical disc device together with a second information signal comprising a time base-corrected signal for an image signal etc. The influence of intermodulation distortion on the first information signal is then effectively prevented with regards to an optical disc, the control of the amount of laser beam light accompanying the recording is simplified and the overall structure can be simplified.

What is claimed is:

1. A disc recording device for recording a first information signal and a second information signal on a disc-shaped recording medium, the disc recording device comprising:
    an optical pick-up having a first laser diode and a second laser diode for recording the first information signal and the second information signal, respectively, at separate locations on the disc-shaped recording medium, wherein the second information signal includes a pilot signal;
    first modulating means for modulating the first information signal at a first frequency;
    first laser diode modulation means for driving the first laser diode based on a signal outputted from the first modulating means;
    means for generating the second information signal of a second frequency and
    second laser diode modulation means for driving the second laser diode based on the second information signal.

2. A disc recording device according to claim 1, wherein the second information signal is a sine wave signal.

3. A disc recording device for recording a first information signal and a second information signal on a disc-shaped recording medium, the disc recording device comprising:
    an optical pick-up having first and second laser diodes for recording the first and second information signals on the disc-shaped recording medium, wherein the second information signal is a signal used in time-axis compensation of the first information signal while the first information signal is being played back from the disc-shaped recording medium;
    first modulating means for modulating the first information signal at a first frequency;
    first laser diode modulation means for driving the first laser diode based on a signal outputted from the first modulating means;
    means for generating the second information signal of a second frequency and
    second laser diode modulation means for driving the second laser diode based on the second information signal.

4. A disc recording device according to claim 3, wherein the first information signal is an image signal.

5. A disc recording device according to claim 4, further comprising a frequency multiplexor for multiplexing and providing to the second laser diode modulation means the second information signal and an audio signal, wherein the second laser diode modulation means drives the second laser diode based on the multiplexed second information signal and the audio signal.

6. A disc recording device according to claim 5, wherein the multiplexor is provided with an address signal of the first information signal and the address signal is frequency multiplexed with the second information signal and the audio signal,
    and the second laser diode modulating means drives the second laser diode based on the multiplexed second information signal, the audio signal and the address signal.

7. A disc playback device for playing back a first information signal recorded on a disc-shaped recording medium and modulated at a first frequency and a second information signal having a second frequency, comprising:
    an optical pick-up having a first laser diode and a second laser diode for playing back the first information signal and the second information signal from the disc-shaped recording medium;
    demodulating means for demodulating the played-back first information signal; and
    a time-base compensator for carrying out time-base compensation on the demodulated first information signal based on the played-back second information signal.

8. A disc playback device according to claim 7, wherein the first information signal is an image signal.

9. A disc-shaped recording medium comprising;
    a first recording area recorded with a first information signal; and
    a second recording area recorded with a reference signal for carrying out time axis compensation when the first information signal is being played back.

10. A disc-shaped recording medium according to claim 9, wherein the first information signal is an image signal.

11. A disc-shaped recording medium according to claim 10, wherein an audio signal is recorded at the second recording area.

12. A disc-shaped recording medium according to claim 11, wherein address information for the first information signal is further recorded at the second recording area.

13. A disc-shaped recording medium according to claim 9, wherein the first recording area and the second recording area are a pair of adjacently formed, spiral shaped pit rows present on the disc recording medium.

14. A disc recording device for recording a first information signal and a second information signal on a disc-shaped recording medium, the disc recording device comprising:
    a pick-up having a first recording head and a second recording head for recording the first information signal and the second information signal, respectively, at separate locations on the disc-shaped recording medium, wherein the second information signal includes a signal used in time-axis compensation of the first information signal while the first information signal is being played back from the disc-shaped recording medium;
    first modulating means for modulating the first information signal at a first frequency;
    first recording head modulation means for driving the first recording head based on a signal outputted from the first modulating means;
    means for generating the second information signal of a second frequency and
    second recording head modulation means for driving the second recording head based on the second information signal.

15. A disc recording device according to claim 14, wherein the second information signal is a sine wave signal.

16. A disc recording device according to claim 14, wherein the second information signal has a frequency of 13.66875 MHz.

17. A disc recording device according to claim 14, wherein the first information signal is an image signal.

18. A disc recording device according to claim 14, further comprising a frequency multiplexor for multiplexing and providing to the second recording head modulation means the second information signal and an audio signal, wherein the second recording head modulation means drives the second recording head based on the multiplexed second information signal and the audio signal.

19. A disc recording device according to claim 18, wherein:

the multiplexor is provided with an address signal of the first information signal and the address signal is frequency multiplexed with the second information signal and the audio signal, and the second recording head modulating means drives the second recording head based on the multiplexed second information signal, the audio signal and the address signal.

20. A disc playback device for playing back a first information signal recorded on a disc-shaped recording medium and modulated at a first frequency and a second information signal having a second frequency, comprising:

a pick-up having a first recording head and a second recording head for playing back the first information signal and the second information signal from the disc-shaped recording medium; demodulating means for demodulating the played-back first information signal; and a time-base compensator for carrying out time-base compensation on the demodulated first information signal based on the played-back second information signal.

* * * * *